United States Patent [19]

Bauman et al.

[11] Patent Number: 4,764,405

[45] Date of Patent: Aug. 16, 1988

[54] METHOD FOR INCREASING BARRIER PROPERTIES OF THERMOPLASTIC SUBSTRATES

[75] Inventors: Bernard D. Bauman, Coopersburg; Rajendra K. Mehta, Trexlertown; Mark A. Williams, Souderton, all of Pa.

[73] Assignee: Air Products and Chemicals, Inc., Allentown, Pa.

[21] Appl. No.: 76,457

[22] Filed: Jul. 22, 1987

[51] Int. Cl.$^4$ .................. B29C 49/46; B05D 3/00; B65D 23/02

[52] U.S. Cl. .................................. 428/35; 264/83; 427/230; 427/322; 428/412; 428/424.2; 428/483; 428/516; 428/518; 428/421

[58] Field of Search ............... 427/230, 236, 322; 264/83; 428/35, 412, 421, 423.1, 424.2, 483, 516, 518

[56] References Cited

U.S. PATENT DOCUMENTS

| | | | |
|---|---|---|---|
| 3,702,258 | 11/1972 | Gibbons | 427/322 |
| 3,862,284 | 1/1975 | Dixon | 264/83 |
| 4,009,304 | 2/1977 | Dixon et al. | 427/322 |
| 4,247,577 | 1/1981 | Imada et al. | 427/40 |
| 4,372,986 | 2/1983 | Imada et al. | 427/322 |
| 4,422,991 | 12/1983 | Phillips | 264/83 |
| 4,515,836 | 5/1985 | Cobbs et al. | 427/425 |
| 4,550,043 | 10/1985 | Bock | 428/36 |

FOREIGN PATENT DOCUMENTS

| | | |
|---|---|---|
| 3523137 | 4/1986 | Fed. Rep. of Germany ........ 264/83 |
| 3535602 | 4/1987 | Fed. Rep. of Germany ........ 264/83 |
| 951090 | 3/1964 | United Kingdom ................ 427/322 |
| 2069870B | 12/1980 | United Kingdom . |

Primary Examiner—John E. Kittle
Assistant Examiner—James J. Seidleck
Attorney, Agent, or Firm—Mark L. Rodgers; William F. Marsh; James C. Simmons

[57] ABSTRACT

The present invention is a method for improving the barrier properties of thermoplastic substrates. A surface of the thermoplastic substrate is contacted with a reactive gas stream having an $F_2$ concentration greater than or equivalent to 0.0001 atm. partial pressure of $F_2$ per atm. total pressure and sufficient oxygen such that the $F_2/O_2$ ratio is less than or equal to about 100, with the remainder being additional reactive and/or non-reactive components. A barrier coating material is applied to the treated surface of the substrate and subsequently undergoes a curing step to form the final product.

17 Claims, No Drawings

METHOD FOR INCREASING BARRIER PROPERTIES OF THERMOPLASTIC SUBSTRATES

TECHNICAL FIELD OF THE INVENTION

The present invention relates to applying coatings to thermoplastic substrates to improve the barrier properties of the substrate.

BACKGROUND OF THE INVENTION

While plastic containers have found wide spread utility in packaging foods and non-food products, they have often been found to be lacking in their barrier characteristics towards gases such as oxygen and carbon dioxide, or solvents such as gasoline, toluene, methylene chloride, or moisture. The need for barrier properties towards oxygen, carbon dioxide, etc., is felt most importantly for the packaging of food. Oxidation of food due to the ambient oxygen could cause browning, rancidity, off-taste and off-smell, mold-formation, etc., sometimes posing serious health hazards. A less serious yet commercially important problem is the loss of carbon dioxide from carbonated beverages, causing the beverage to go "flat".

The need for barrier towards organic substances is felt in both the foods as well as non-food applications. While it is desirable to package a number of products, such as coffee or fruit juices in unbreakable, light weight or transparent plastic containers, such containers often absorb the essential oils and aroma components out of the product, resulting in an off-taste or smell, called distortion. The perfume, cologne, and cosmetic industry has also long recognized the same problem with respect to their packaging needs. The solvent barrier of a plastic container is also a very important characteristic when there is a need to package items like gasoline additives, solvent-based cleaners, etc. The industry has also long faced the problem of migration of unreacted monomers, low molecular weight polymers and other processing aids and additives from the container into the product; i.e., leaching.

Numerous attempts have been made to improve the barrier characteristics of plastic containers. For example, U.S. Pat. No. 3,862,284 discloses a process whereby the barrier properties of blow molded thermoplastic articles are improved by employing a blowing gas containing about 0.1 to about 20% by volume fluorine during the expansion of the parison.

U.S. Pat. No. 4,515,836 discloses a process for providing a substrate such as a polyethylene terephthalate container with a gas barrier coating of a copolymer of vinylidene chloride. The outside surface of the container is impacted with a stream of a stabilized aqueous polymer dispersion with sufficient force to cause selective destabilization of the dispersion at the surface interface to form a gel layer containing the polymer in the continuous phase. This gel layer serves as an adhesive layer for an overlaying layer of the aqueous polymer dispersion as a continuous uniform coating.

U.K. Pat. No. 2069870B discloses a process for improving the barrier properties of polymeric containers, by treating at least one surface of the container with sulphur trioxide, followed by washing with an aqueous medium and subsequently applying a layer of a dispersion of a melamine-formaldehyde or urea-folmaldehyde condensation product. The dispersion layer is then cured to form the final product.

U.S. Pat. No. 4,247,577 discloses a method for placing a covering layer of a cured organopolysiloxane composition onto the surface of a shaped article of a vinyl chloride resin in order to improve or mask defective surface properties of the resin. The method comprises treating the surface of a vinyl chloride resin article with a low temperature plasma of gas, placing a covering layer of a curable organopolysiloxane composition on the so treated surface of the article, and subjecting the article with the curable organopolysiloxane composition to curing conditions.

U.S. Pat. No. 4,550,043 discloses preforms formed by injection molding thermoplastic material which have internal barrier layers and internal layers of high thermal stability. The disclosed preforms are utilized in the forming of blow molded articles.

Dixon, et al., U.S. Pat. No. 4,009,304 teaches a process for improving adhesion of polyester yarn, tire cord or fabric in polyester reinforced rubber goods such as tires. Improved adhesion is achieved by fluorinating the polyester yarn, tire cord or fabric prior to incorporation into the tire and rubber goods.

BRIEF SUMMARY OF THE INVENTION

The present invention is a method for improving the barrier properties of a thermoplastic substrate. One or more surfaces of the thermoplastic substrate are contacted with a reactive gas mixture having an $F_2$ concentration greater than or equivalent to 0.0001 atm. partial pressure (p.p.) of $F_2$ per atm. total pressure and oxygen in a concentration such that the $F_2/O_2$ volumetric ratio of the mixture is less than or equal to about 100, with the balance being additional reactive and/or non-reactive components (e.g., nitrogen, argon, etc.). The treated surface is then coated with a suitable barrier coating and is subsequently subjected to a conventional curing step. Treatments can be carried out at pressures between 0.1 atm and 50 atm; however preferred pressures are from 1 to 30 atm., such as those used in "post-treatment" or in stretch blow-molding. Lower pressures are most preferred, especially at higher $F_2$ concentrations.

It is preferred that the barrier coating make the thermoplastic coating substantially impermeable to gases, such as $O_2$ and $CO_2$, and also to organic liquids and vapors. The method of the present invention is applicable to all molding processes, including extrusion blow molding, injection blow molding, stretch blow molding, injection molding, thermoforming etc., as well as extrusion processes, such as those used in making films and sheets. The present method allows the theromplastic substrates to be coated with a barrier material which firmly adheres to the substrate, and which prevents the passage of the wide range of both polar and non-polar liquids and vapors through the substrate.

DETAILED DESCRIPTION OF THE INVENTION

The present invention is a method for increasing the barrier properties of a thermoplastic substrate toward gases and organic liquids and vapors. The thermoplastic substrate is first contacted with a reactive gas mixture having an $F_2$ concentration greater than or equivalent to 0.0001 atm. p.p. of $F_2$ per atm. total pressure and oxygen in a concentration such that the $F_2/O_2$ volumetric ratio of the mixture is less than or equal to about 100, with the remainder being additional reactive and/or inert or non-reactive with respect to the thermoplastic substrate. The thermoplastic substrate can be any type of plastic which can be injection molded or blow molded, typical examples including high density polyethylene (HDPE), low density polyethylene (LDPE), polypropylene (PP), polyethylene terephthalate (PET), polyethylene terephthalate glycol (PETG), polycarbonates (PC), polyvinyl chloride (PVC), polystyrene, polyamides, polybutylene terephthalate, polymethyl pentene and copolymers thereof. Typical applications for the present invention involve containers or bottles molded from one or more of the above thermoplastic substrates. At least one major surface of the thermoplastic substrate is contacted with the reactive gas stream for a period of time ranging between one second to five minutes, depending upon the size of the substrate being treated. In a preferred embodiment of the present invention, the interior of a container formed from the thermoplastic substrate is treated with the reactive gas mixture in a single step while the container is being blow molded. It is advantageous to treat and coat the interior of the containers formed from the substrates, so as to prevent penetration into the inner layer of any odors, gases, or flavors present in the material to be stored within the container. While it is also possible to treat and coat the exterior of the container in addition to or in place of treating and coating the interior, treatment of the interior only is generally preferred.

It was found that a very specific range of both fluorine and oxygen must be present in the treating gas in order to achieve the desired adhesion of the subsequently added barrier coating. In addition to the specific ranges of fluorine and oxygen which must be present, optionally chlorine up to 40 volume percent may be added, and in many instances enhances the adhesion of the barrier coating. Other reactive gases may or may not enhance the performance of the present invention depending upon the particular substrate and coating used. Such additional reactive gaseous components include: chlorine, bromine, sulfur dioxide, sulfur trioxide, carbon monoxide, nitrogen oxide, BrCl, BrCl$_3$, ClF, ClF$_3$, and mixtures thereof. The pressure and temperature of the reactive gases depend upon the type of blow molding practice being used for the particular thermoplastic substrate. Typically pressures range from between 0.1 atm. up to 50 atm., with the upper range being used for stretch blow molding, and typical temperatures ranging from about room temperature up to temperatures exceeding conventional blow molding temperatures for the polymer being used.

After the thermoplastic substrate is contacted with the reactive gas mixture, a barrier coating is subsequently applied to the treated surface. The barrier coating can be applied by any conventional technique known in the art such as spray coating, flow coating, dip coating, etc. A wide variety of barrier coatings can be used, depending upon the specific properties which are desired to be imparted to the substrate. Examples of typical barrier coatings which are very effective at preventing the ingress or loss of organic compounds, gases such as oxygen and carbon dioxide, and moisture into or out of the container include: coatings selected from the group consisting essentially of polyvinylidene chlorides, ethylene vinyl alcohols, epoxies, polyurethanes, acrylics, polyvinyl chloride, urea-formaldehyde, silicons and fluorocarbons. Optionally, the coating can be present in a solvent to form a solution or mixed as an emulsion prior to being applied to the substrate. Coating thicknesses generally average between 1 micron and 50 microns with thicknesses between 2 and 25 microns being preferred. It was found that the above barrier coatings adhere firmly to the surface of the thermoplastic substrate after said surface has been treated with the appropriate reactive gas mixture without the need for additional bonding agents. When similar untreated thermoplastic substrates are coated with the same barrier coatings, the surface of the substrates remain unwettable and the coatings do not firmly adhere to the surface.

Without being bound by theory, it is believed that the present invention is effective because of surface modifications of the thermoplastic substrate by the reactive gas which permits adhesion of the coatings onto the surface of the substrate. It has been observed that the surface energy of the thermoplastic substrate increases by at least 50%, and in many cases greater than 100% after treatment with the reactive gas mixture. It is believed that the reactive gas mixture consisting of fluorine, oxygen and optionally other reactive gases, results in the formation of certain functionalities such as hydroxyl, carboxyl, chloride, etc. on the usually low-energy polymeric surface of the substrate. The addition of such functionalities raises the surface energy and makes the surfaces more wettable. Since adequate wetting by a coating on a surface is one of the requirements for adhesion, the presence of such functionalities greatly facilitates the adhesion of various coatings on the modified surface. Once a coating is adhered to the polymeric substrate surface, it can inhibit permeation through one or more of several mechanisms; (i.e., high crystallinity, high degree of cross-linking, low degree of solvation in the permeate, etc.).

After the treated substrate surface is coated with a barrier coating, it is subsequently cured by any typical method known in the art, such as heat treating, ultra violet radiation treating, and the like.

The present invention provides for an efficient and versatile process, which can employ a wide variety of thermoplastic substrates, and barrier coatings, depending upon the desired end use. While the present invention is especially useful for treating the interior of plastic containers, the basic process can be applied to a wide variety of applications; i.e., extrusion coating of films or flat sheets.

The following examples were carried out to illustrate the method of the present invention, and are not meant to limit the scope of the invention.

EXAMPLE 1

Containers were blown using several of the thermoplastic substrates listed above using a mixture of 1% by volume F$_2$ (0.07 atm. p.p.), 18% by volume O$_2$ (1.25 atm. p.p.) and the balance N$_2$ (5.7 atm. p.p.) on an extrusion blow molding machine. For comparison, similar containers were also blown with air, as in the conventional practice. The containers were flow coated with an excess of barrier coating solution and dried at 140° C. for two hours. After allowing the containers air dry for several days at room temperature, the adhesion of the coatings was evaluated per ASTM D-3359-78 (commonly known as the cross-hatch test) using Scotch ® brand cellophane tape.

The adhesion levels for the ASTM D-3359-78 test are reported as follows:

| Scale | % of Squares Remaining |
|-------|------------------------|
| 5 | 100 |
| 4 | 95+ |
| 3 | 85+ |
| 2 | 65+ |
| 1 | 35+ |
| 0 | 0-35 | an adhesion level of 5 is most desirable; however, levels of 4 and 3 are also considered acceptable.

The specific substrates and coatings used as well as the ASTM scale results for adhesion for both the treated and untreated (air blown) containers as set out in Table 1 below:

TABLE 1

| TREATED | SUBSTRATE | COATING | ASTM SCALE |
|---------|-----------|---------|------------|
| Yes | PP[1] | PVOH[2] | 5 |
| No | PP | PVOH | 0 |
| Yes | PP | PVDC[3] | 5 |
| No | PP | PVDC | 0 |
| Yes | HDPE | PVOH | 5 |
| No | HDPE | PVOH | 0 |
| Yes | HDPE | PVDC | 5 |
| No | HDPE | PVDC | 0 |
| Yes | PVC | PVOH | 5 |
| No | PVC | PVOH | 0 |

[1]Polypropylene
[2]10% by weight polyvinyl alcohol in water
[3]50% by weight polyvinylidene chloride emulsion

EXAMPLE 2

Several 16-oz polyester (PET) containers were injection-stretch blow molded and post-treated using 1% $F_2$ (0.01 atm. p.p.), 40% $Cl_2$ (4 atm. p.p.), 10% $O_2$ (0.1 atm. p.p.) and the balance nitrogen (0.5 atm. p.p.). Similar containers were also blown with air to use as standards:

Run 1: A 10% weight of aqueous solution was made from a copolymer of ethylene and vinyl alcohol. Treated and untreated PET containers were flow coated with an excess of the solution and, after film formation, the remaining solution was discarded. The containers were dried at 65° C. for several hours followed by room temperature drying for several days. Adhesion testing, as described in Example 1 above, was conducted on the containers. As expected, the coatings on the untreated (air blown) containers separated readily (ASTM scale=0) whereas those on the treated containers did not come off in spite of repeated attempts (ASTM scale=5).

Run 2: A second run was carried out similar to that described in Run 1 above using a 50% by weight of highly crystalline PVDC emulsion as the barrier coating. After drying the coating, adhesion tests were carried out. Again, the coatings on the untreated container separated readily (ASTM scale=0); whereas those on the treated container stuck tenaciously on the coated container (ASTM scale=5).

EXAMPLE 3

The same procedure and reactive gas composition as used in Example 1 were used on 12-oz oriented polypropylene jars made by stretch blow molding. Both post-treated and untreated jars were flow coated on the inside with PVOH and PVDC coatings. After drying, the coatings were tested for adhesion. The treated containers showed outstanding adhesion between the coating and the container wall; whereas the coating on the untreated containers could be readily separated even by rubbing dry fingers on them.

EXAMPLE 4

Several 16-oz HDPE containers were blown with air and a gas mixture containing 0.5% $F_2$, (0.015 atm. p.p.), 20% $O_2$ (1.4 atm. p.p.) and the balance nitrogen (5.6 atm. p.p.). Epoxy coatings were flow coated on the inside and cured at 65° C. for four hours. The coating composition was: liquid epoxy resin (Bis A type, D.E.R. 324 from Dow Chemical Co.)-100 gms and triethylene teteramine (TETA, D.E.H. 24 from Dow Chemical Co.) as hardener-12.9 gms. After the coatings were fully cured, the containers were squeezed repeatedly to evaluate the adhesion of coating to the containers. The coating on untreated container cracked readily and flaked off, whereas the coating on the treated containers stuck to the wall tenaciously. To further examine the adhesion of coating, one hundred evenly spaced cross-hatched were scribed on a one square inch coated area of a treated container. Tape adhesion tests were conducted several times for the treated containers but none of the squares lifted off.

EXAMPLE 5

In order to determine the effect of oxygen concentration in the blowing gas on adhesion, several HOPE and PP bottles were blown at about 7 atm. total pressure with the gas compositions listed in Table 2 below. Control bottles; i.e., bottles blown with air only, were also blow molded. A PVDC latex (Daran ®8600 from W. R. Grace and Co.) was applied on the inside of the containers by flow coating, and cured according to the manufacturer's recommendations. The samples were treated per ASTM D-3359 for adhesion and the results are reported in Table 2 below.

TABLE 2

| | Gas Composition | | | ASTM Scale | |
|---|---|---|---|---|---|
| Run | % $F_2$ | $O_2$% | % $N_2$ | HDPE | PP |
| 1 | Control | | | Film Could Not Be Formed | |
| 2 | 1.1 | 0.0015 | 98.9 | 1 | 0 |
| 3 | 1.5 | 0.0096 | 98.5 | 0 | 0 |
| 4 | 0.9 | 0.0457 | 99.0 | 2 | 0 |
| 5 | 1.0 | 0.0953 | 98.9 | 2 | 0 |
| 6 | 1.0 | 0.506 | 98.5 | 3 | 4 |
| 7 | 0.15 | 0.10 | 99.75 | 3 | 4 |
| 8 | 1.0 | 19.0 | 80.0 | 5 | 5 |

The results of the above runs as set out in Table 2 above show that a sufficient oxygen concentration to maintain an $F_2/O_2$ ratio of less than about 100 is required at any fluorine level to provide acceptable adhesion (ASTM scale of at least 3). For in-situ treatment as above, it is preferred that the $F_2/O_2$ ratio be less than about 10, whereas for post treatment higher ratios; i.e. up to about 100 can be acceptable.

EXAMPLE 6

Experiments similar to those of Example 5 above (i.e., blow molding at 7 atm.) were carried out at various oxygen levels using trace amounts of fluorine; i.e., less than 0.01% by volume, or 0.0007 atm. p.p. which is equivalent to 0.0001 atm. p.p. per atom. total pressure. In a majority of cases, PVDC film did not form on the surface of the container. When a film could be formed, the adhesion level was found at 0 or 1 per ASTM D-3359. These results indicate that a fluorine ($F_2$) concentration of at least 0.01% by volume i.e. 0.0001 atm. p.p. per atm. total pressure is critical for the present method.

EXAMPLE 7

Several experiments were conducted with very small quantities of HDPE and PP to determine the effective upper limits of the treatment gases. It was found that at temperatures as low as 70° C., as little as 10% fluorine in the reactive gas mixture at a pressure of 7 atmospheres (i.e., 0.1 atm. p.p. $F_2$ per atm. total pressure) produced a brownish surface with cracks on the surface and a rather substantial exotherm. Clearly the surface of the polymer had degraded. This indicates that if a blow molding operation is carried out at a pressure of 30 atm., a $F_2$ concentration of less than 3 atm. p.p. ($0.1 \times 30$) should be used. Further experimentation was deemed unsafe hence actual blow molding at high gas concentrations was not carried out.

EXAMPLE 8

Several runs were carried out to illustrate the gas barrier properties of internally coated containers using the present method. For comparison, untreated containers as well as treated but uncoated containers were tested. The various substrates (containers), gas compositions and coatings, as well as the gas transmission rates as set out in Table 3 below.

TABLE 3

| Container | Surface Treatment | Coating Thickness | Gas Transmission Rate (cc/package-24 hrs.) |
|---|---|---|---|
| HDPE | — | — | $O_2$ - 1.96 |
| HDPE | 1% $F_2$**  18% $O_2$, 81% $N_2$ | — | $O_2$ - 1.83 |
| HDPE | 1% $F_2$, 18% $O_2$, 81% $N_2$ | PVDC - 0.4 mil. | $O_2$ - 0.33 |
| PC* | — | — | $O_2$ - 3.61 |
| PC | 1% $F_2$, 18% $O_2$, 81% $N_2$ | — | $O_2$ - 3.10 |
| PC | 1% $F_2$, 18% $O_2$, 81% $N_2$ | PVDC - 0.4 mil. | $O_2$ - 0.20 |
| PET | — | — | $O_2$ - 0.561 |
| PET | 1% $F_2$, 18% $O_2$, 40% $Cl_2$, 41% $N_2$ | PVDC - 0.4 mil. | $O_2$ - 0.058 |
| PP | — | — | $O_2$ - 1.503 |
| PP | 1% $F_2$, 18% $O_2$, 81% $N_2$ | PVDC - 0.3 mil. | $O_2$ - 0.130 |
| PET | — | — | $O_2$ - 1.561 |
| PET | 1% $F_2$, 18% $O_2$, 40% $Cl_2$, 41% $N_2$ | PVDC - 0.4 mil. | $O_2$ - 0.030 |
| PP | — | — | $O_2$ - 1.029 |
| PP | 1% $F_2$, 18% $O_2$, 81% $N_2$ | PVDC - 0.3 mil. | $O_2$ - 0.286 |

TABLE 3-continued

| Container | Surface Treatment | Coating Thickness | Gas Transmission Rate (cc/package-24 hrs.) |
|---|---|---|---|

*Polycarbonate
**0.01 atm. p.p. $F_2$ per atm. total pressure

From the above results it can be seen that the barrier properties are significantly increased (low gas transmission rates) for containers which are treated and coated in accordance with the present invention. Additionally, it is shown that surface treatments with reactive gas mixtures above, without subsequent coatings, are not effective in providing a gas barrier.

EXAMPLE 9

Several runs were carried out to illustrate the solvent barrier properties of internally coated containers using the present method. For comparison, untreated containers as well as treated but uncoated containers were tested. The various materials employed, as well as the process and treatment conditions, and barrier results are reported in Table 4 below.

TABLE 4

| Container | Treatment | Coating | Solvent | Test Conditions | % Wt. Loss |
|---|---|---|---|---|---|
| HDPE | — | — | Methylene Chloride | 4 weeks, room temp. | 2.88 |
| HDPE | 1% $F_2$** 18% $O_2$, 81% $N_2$ | PVOH | Methylene Chloride | 4 weeks, room temp. | 1.75 |
| HDPE | — | — | Toluene | 4 weeks, 50° C. | 46.0 |
| HDPE | 1% $F_2$, 18% $O_2$, 81% $N_2$ | — | Toluene | 4 weeks, 50° C. | 42.0 |
| HDPE | 1% $F_2$, 18% $O_2$, 81% $N_2$ | Epoxy | Toluene | 4 weeks, 50° C. | 1.74 |
| HDPE | — | — | Naphtha | 4 weeks, 40° C. | 15.32 |
| HDPE | 1% $F_2$, 40% $Cl_2$, 10% $O_2$, 81% $N_2$ | PU | Naphtha | 4 weeks, 40° C. | 6.35 |
| HDPE | 1% $F_2$, 40% $Cl_2$, 10% $O_2$, 81% $N_2$ | Epoxy | Naphtha | 4 weeks, 40° C. | 0.38 |
| HDPE | — | — | Syn. Gasoline* | 4 weeks, 50° C. | 34.5 |
| HDPE | 1% $F_2$, 99% $N_2$ | — | Syn. Gasoline | 4 weeks, 50° C. | 33.0 |
| HDPE | 1% $F_2$, 18% $O_2$, 81% $N_2$ | Epoxy | Syn. Gasoline | 4 weeks, 50° C. | 6.0 |

*Synthetic Gasoline = 42.5% toluene, 42.5% hexane, 15% methanol.
**0.01 atm. p.p. $F_2$ per atm. total pressure As can be seen from the results reported in Table 4 above, the container treated and coated in accordance with the present invention exhibited greatly improved solvent barrier properties compared to the untreated or treated and uncoated containers. This increase in solvent barrier properties was observed for all the coatings and solvents tested.

EXAMPLE 10

A wide-mouth, 5-liter polypropylene container was injection molded and post-treated with a gas mixture consisting of 5% $F_2$, 10% $O_2$, and 85% $N_2$ at a total pressure of 1 atm. A similar container was also injection molded using air in the mold. A polyurethan coating was applied on the inside of each of the two containers and cured. Subsequently, they were tested for adhesion. The coating peeled readily off the untreated container, whereas it adhered tenaciously to the treated container. Similar containers were evaluated for their solvent barrier characteristics, using a solvent-based paint. The vehicle in the paint were primarily tall alkyd and dryers (45%) and mineral spirits (51%). After tightly closing the containers with lids, they were stored in a permeation oven at 50° C. Within a couple of days, the coating on the untreated container was separated from the wall. The container had begun to panel and was showing excessive weight loss (more than 2%). The treated container showed no such signs of separation and had weight loss of less than 0.1%.

Having thus described the present invention, what is now deemed appropriate for Letters Patent is set out in the following appended claims.

What is claimed is:

1. A method of increasing the barrier properties of a thermoplastic substrate selected from the group consisting essentially of polyethylene, polypropylene, polyethylene terephthalate, polyethylene terephthalate glycol, polycarbonates, polystyrene, polyamides, polybutylene terephthalate, polymethyl pentene, polyvinyl chloride and copolymers thereof, said method comprising the steps of:
   (a) contacting at least one major surface of the thermoplastic substrate with a gaseous reactant stream having an $F_2$ concentration greater than or equivalent to 0.0001 atmosphere partial pressure of $F_2$ per atmosphere total pressure, oxygen in sufficient concentration such that the $F_2/O_2$ volumetric ratio is less than 100, with the balance being additional reactive and/or non-reactive components;
   (b) applying to said major surface of the thermoplastic substrate, a barrier coating selected from the group consisting essentially of polyvinylidene chlorides, ethylene vinyl alcohols, epoxies, polyurethanes, acrylics, polyvinyl chloride, ureaformaldehyde, silicones and fluorocarbons; and
   (c) curing said barrier coating.

2. The method in accordance with claim 1 wherein said thermoplastic substrate is in the form of a container.

3. The method in accordance with claim 2 wherein the major surface of the thermoplastic substrate which is contacted by the gaseous reactant stream and subsequently coated with a barrier coating is the interior surface of the container.

4. The method in accordance with claim 3 wherein the container is formed by injection molding, blow molding, or thermoforming.

5. The method in accordance with claim 4 wherein the interior of the container formed from the thermoplastic substrate is treated with the reactive gas mixture in a single step while the container is being molded.

6. The method in accordance with claim 1 wherein the barrier coating is applied to the treated surface by a technique selected from the group consisting of spray coating, flow coating and dip coating.

7. The method in accordance with claim 1 wherein the temperature of the reactive gas is in the range from about room temperature up to temperatures exceeding the conventional blow molding temperature for the substrate being treated.

8. The method in accordance with claim 1 wherein the gaseous reactant stream contains one or more additional reactive components selected from the group consisting of: chlorine, bromine, sulfur dioxide, sulfur trioxide, carbon monoxide, nitrogen oxide, BrCl, $BrCl_3$ and $ClF_3$.

9. The method in accordance with claim 1 wherein at least one major surface of the thermoplastic substrate is contacted with a reactive gas stream for a period of time between 1 second and 5 minutes.

10. The method in accordance with claim 1 wherein the barrier coating has average thicknesses between 1 and 50 microns.

11. The method in accordance with claim 1 wherein the barrier properties of the thermoplastic substrate are increased with respect to $O_2$, $CO_2$, organic liquids and organic vapors.

12. The method in accordance with claim 1 wherein the gaseous reactant stream contains oxygen in a sufficient amount such that the $F_2/O_2$ volumetric ratio is less than about 10.

13. The method in accordance with claim 1 wherein the gaseous reactant stream is at a pressure between 0.1 and 50 atm.

14. A polymeric container having improved barrier properties, said container comprising:
   (a) a thermoplastic substrate selected from the group consisting of polyethylene, polypropylene, polyethylene terephthalate, polyethylene terephthalate glycol, polycarbonate and polyvinyl chloride of which at least one major surface has been contacted with a reactive gas stream having an $F_2$ concentration greater than or equivalent to 0.0001 atmosphere partial pressure of $F_2$ per atmosphere total pressure and $O_2$ in sufficient concentration such that the $F_2/O_2$ volumetric ratio is les than 100, for a period of time between one second and five minutes, and
   (b) a barrier coating selected from the group consisting of polyvinylidene chlorides, ethylene vinyl alcohols, epoxies, polyurethanes and fluorocarbons bonded, in the absence of any bonding agent, to the surface of said thermoplastic substrate which was contacted with said reactive gas stream.

15. The container in accordance with claim 14 wherein the surface of the thermoplastic substrate which has been contacted with the reactive gas stream is the interior surface of the container.

16. The container in accordance with claim 14 wherein the barrier coating has an average thickness between 1 and 50 microns.

17. The container in accordance with claim 14 having improved barrier properties with respect to $O_2$, $CO_2$, organic liquids and organic vapors.

* * * * *